March 9, 1954 J. H. SWEER 2,671,610
SERVO MECHANISM INTEGRATOR
Filed Dec. 18, 1951
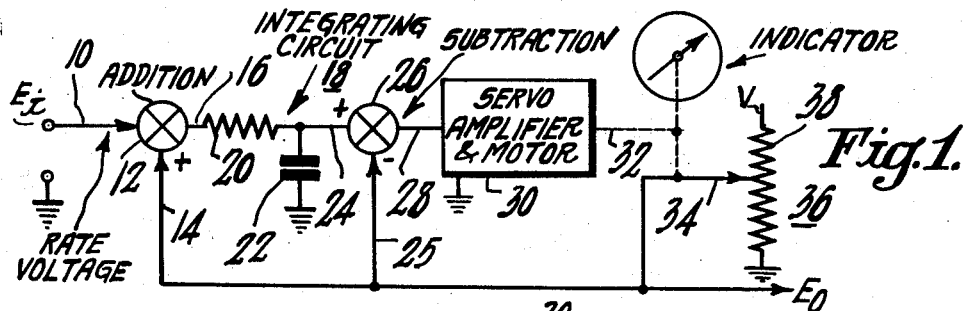
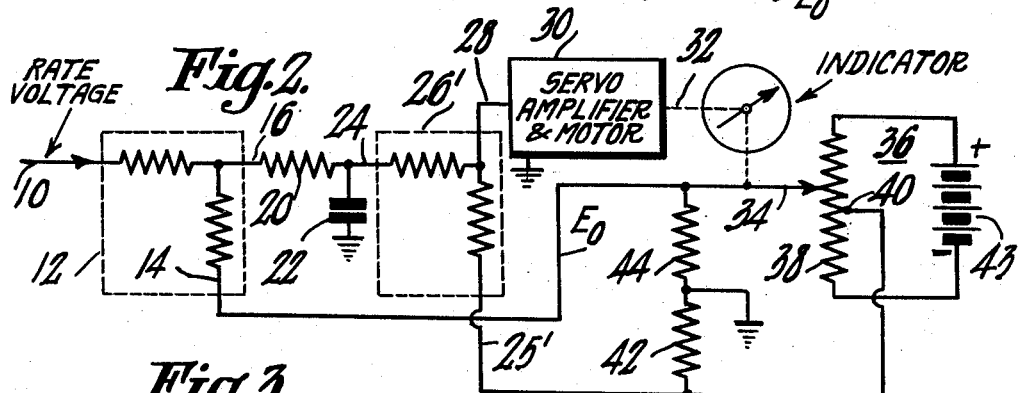
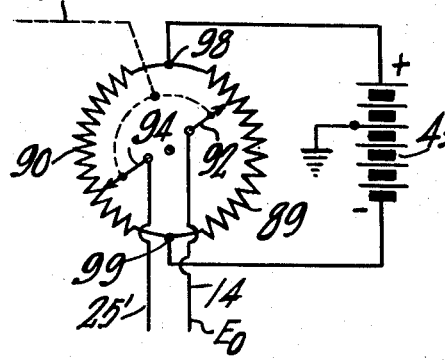
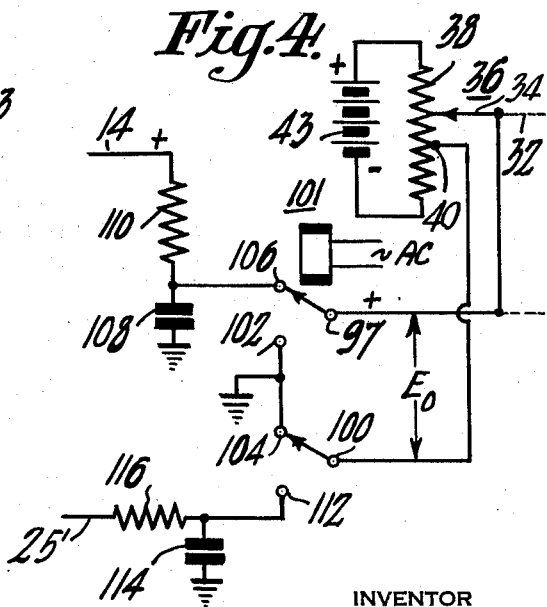
INVENTOR
John H. Sweer
BY
ATTORNEY Patented Mar. 9, 1954

2,671,610

UNITED STATES PATENT OFFICE 2,671,610

SERVO MECHANISM INTEGRATOR

John H. Sweer, Collingswood, N. J., assignor to Radio Corporation of America, a corporation of Delaware Application December 18, 1951, Serial No. 262,298

10 Claims. (Cl. 235—61)

1

The present invention relates to servo mechanisms, and particularly to an improved servo mechanism integrator.

In many prior servo mechanism integrators, where high integrating accuracy has been desired, a highly accurate tachometer is employed, the rate voltage from which is constantly compared with the voltage to be integrated to derive an error voltage. The error voltage is employed to control a servo amplifier and motor. The motor may drive an indicator and also the tachometer which provides the rate voltage. It is apparent that if the derivative of the output voltage is equal to the input (the difference being the error voltage) then the output must be the integral of the input. The output derivative is the tachometer voltage. The tachometer is usually a D. C. generator. One of the difficulties of this prior type of system is that the error signal may lead or lag, due perhaps in part to lead or lag in the tachometer itself, and at least in part to lag or lead in the error voltage deriving circuit. This lead or lag would not be objectionable in many instances if only it did not introduce an error in the final integration, which unfortunately is introduced in systems of the type just described. Some more or less successful efforts have been made to avoid the error-introducing causes and the limitations imposed by the low frequency lag of the tachometer or the error deriving circuits. Another practical difficulty is the considerable cost of an accurate tachometer. A further difficulty is that many tachometers (e. g. specially designed D. C. generators) introduce noise as a result of commutation.

The present invention is especially applicable to a servo mechanism or system designed to receive a rate or speed voltage and to indicate position. For example, in airborne radar (radio echo detection and ranging apparatus) of certain types, a voltage is readily derived proportional to ground speed. If the ground speed of a plane or the like in a certain coordinate after the plane leaves a known position is thus available, the distance travelled is readily derived by an integrator, for dead-reckoning or other navigational purposes.

It is an object of the present invention to provide an integrating circuit improved over those heretofore employed.

Another object of the invention is to provide a novel method of integrating a rate voltage.

Another object of the invention is to remove the low frequency limitation found in a tachometer type servo integrating circuit which limi-

2 tation is imposed by reason of lag in tachometer or in the derivation of the tachometer voltage.

A further object of the invention is to improve servo mechanism integrators to cause them to give a more accurate response or indication after a suitable time lapse.

A further object of the invention is to provide an improved servo system of the type receiving a rate voltage and providing by integration thereof a voltage or indication of position.

According to the invention, a servo mechanism is provided having a load driven at a rate of speed controlled by an error voltage. A position voltage is derived proportional to the load position. The rate voltage (defined herein as the voltage to be integrated) has the position voltage added to it. The sum of the rate and position voltages is applied to a so-called integrating circuit of passive elements, and from the quasi-integrated sum is subtracted the position voltage, (or its equal). The difference voltage thus derived is the error voltage which controls the motor speed. Preferably potentiometer means are employed to derive the position voltage.

The foregoing and other objects, advantages, and novel features of the invention will be more fully apparent from the following description when taken in connection with the accompanying drawing in which like reference numerals refer to like parts and in which:

Fig. 1 is a diagram schematically illustrating one embodiment of the invention; and Fig. 2 is a diagram schematically illustrating a specific circuit for deriving the position voltage to be added to the rate voltage and the position voltage to be subtracted from the differentiated sum of rate and position voltages; and Figs. 3 and 4 illustrate variations of portions of the circuit of Fig. 2.

Referring to Fig. 1, the voltage to be integrated, or rate voltage, is applied by a connection 10 to an addition circuit 12. The addition circuit 12 also receives the position voltage by a connection 14. The addition circuit 12 has for its output on a connection 16 the sum of the rate and position voltages. Connection 16 applies this sum voltage across a so-called integrating circuit 18 comprising the passive elements of a resistor 20 and a capacitor 22. The quasi-integrated sum voltage developed across the capacitor 22 of integrator 18 is connected by means of a connection 24 to a subtraction circuit 26 in which the position voltage is subtracted from the integrated voltage. The term quasi-integrated is used because a true integration is not secured. The position voltage is applied by a connection 25 to the subtraction circuit 26. The output of the subtraction circuit 26 is applied as an error voltage by a connection 28 to a servo amplifier and motor 30 illustrated as a block because many different types of servo amplifier and motor are suitable. The motor of the amplifier and motor 30 is mechanically connected as by a shaft 32 (indicated schematically by a dashed line) to drive the arm 34 of a potentiometer 36 as the servo load. The arm position may be indicated by an indicator also driven by shaft 32. If desired, position (or the integrated value) may be indicated by a voltmeter (not shown) connected to receive the voltage $E_0$. A fixed voltage V is applied to the resistor 38 of potentiometer 36. The arm 34 thus picks up a voltage from the potentiometer resistor 38 depending on the position to which the arm 34 is driven by the shaft 32. The position voltage thus picked up may be connected to connections 14 and 25 for addition and subtraction respectively in the addition and subtraction circuits 12 and 26.

In operation it may be assumed that the error voltage on connection or lead 28 for the servo amplifier and motor 30 is never very different from zero. That is, that the output voltage $E_0$ may be taken as substantially equal to the voltage at connection 24. This assumption is especially justified since interest is here directed mainly to the low-frequency or slow response of the circuit. Then:

$$(1) \quad E_i + E_0 = E_0 + RC\frac{d}{dt}E_0$$

where $E_i$ is the input voltage and R and C the resistance and capacitance of the resistor and capacitor 20 and 22 respectively. The Equation 1 equates the voltage impressed across the passive integrating network at the voltage across the network expressed in terms of (a) the voltage across the capacitor ($E_0$) and (b) that across the resistor expressed in terms of the capacitor voltage and the integrating circuit parameters. From (1), it follows that:

$$(2) \quad E_0 = \frac{RC}{1}\int E_i dt + K$$

where K is a constant of integration.

Therefore it follows that the output voltage $E_0$ (which is indicated by the indicator or the arm 34 position) is the integral of the applied voltage $E_i$. If $E_0 = 0$ when $E_i = 0$, the constant of integration K is zero.

It is pointed out that usually one considers the passive integrating circuit 18 to have a voltage across capacitor 22 which is the integral of the voltage across both the resistor and capacitor. However, after a time, the voltage across the capacitor approaches that across the integrating circuit 18. The integrating circuit therefore integrates accurately only when a period of the voltage to be integrated is small with respect to the time constant RC. Thus a low-frequency limitation is imposed below which integration by the passive circuit alone is not accurate. The present circuit, however, removes this low frequency limitation, and integrates accurately when a period of the voltage to be integrated is large compared to the time constant RC, even to D. C. (direct current) voltage. However, even if the integrating circuit is accurate, and the response of the servo-loop sufficiently rapid, no accuracy is lost. Of course, the integration extends only to the range of equivalent voltage available at the extremes of potentiometer 36.

Referring to Fig. 2, a specific circuit for the addition and subtraction of the position voltage is illustrated. The motor shaft 32 drives potentiometer arm 34 as in Fig. 1. A source exemplified by a battery 42 applies voltage across the resistor of potentiometer 36. The voltage between a center tap 40 of potentiometer 36 and arm 34 is applied by suitable connections across equal serially connected resistors 42 and 44 grounded at their junction. Therefore across each resistor 42 and 44 is developed a voltage equal to that across the other but opposite in polarity. These equal and opposite polarity voltages are employed in circuits 12 and 26' which are both known addition circuits (resistor networks) but are considered as the equivalents of the addition and subtraction circuits 12 and 26, respectively. The voltage across resistor 44 is applied to network 12 by connection 14; and that across resistor 42 is applied by connection 25' to network 26'. It will be understood that if an equal voltage of opposite polarity is added (as in circuit 26 of Fig. 2) it is the full equivalent of the subtraction of a voltage of the same polarity as in 26' of Fig. 1. The resistor networks 10 and 12 are familiar to those skilled in the art and require no further description. However, the resistance values should be chosen or selected so that, especially at connection 24, the integrating circuit 18 is not so loaded that Equation 1 no longer applies. In other words, at the highest frequency of interest, the impedance shunted across capacitor 22 by the rest of the circuit connected to connection 24 must be much greater (at least 10 times greater) than that of capacitor 22.

Another arrangement for securing equal and opposite polarity voltages equal to $E_0$ in amplitude may be that shown in Fig. 3. In Fig. 3 a pair of potentiometers 90 and 89 have ganged arms 92 and 94 respectively. The source 43 is connected to junctions 98 and 99 of the potentiometer resistors connected in parallel. The arms 92 and 94 give oppositely poled outputs with respect to a ground connection at the mid-voltage point of source 43. The opposite polarity voltages from arms 92 and 94 may then be applied to networks 12 and 26' of leads 14 and 25' respectively.

The potentiometers 89 and 90 are so driven that equal and opposite polarity voltages are provided at the leads 14 and 25' respectively. The voltage on connection 14 is added to that on 10 of Fig. 2 and the opposite polarity voltage on lead 25' is added to that on 24 of Fig. 2. The manner in which the circuit of Fig. 3 is interconnected with that of Fig. 2 and the portions of the circuit of Fig. 2 that it replaces will be apparent to those skilled in the art from the like numbered parts and the principles of operation explained hereinbefore.

Still another means to provide equal and opposite polarity voltage is illustrated in Fig. 4. Potentiometer arm 34 may be connected to one terminal 97 of a relay 101 acting as a double pole-double throw switch. Another terminal 100 of relay 101 is connected to a tap on potentiometer resistor 38. Contact points 102 and 104 of relay 101 are connected at a junction to ground. One other contact point 106 of relay 101 is connected to a voltage smoothing network of capacitor 108 and resistor 110. Another contact point 112 of relay 101 is connected to a second voltage smoothing network of a capacitor 114 and resistor 116. Contacts 104 and 106 are made at the same time when contacts 102 and 112 are opened, and vice-versa, for equal periods at a rate preferably greater than the highest frequency component to be integrated. From the smoothing network, the desired oppositely poled voltages may be applied by connections 14 and 25' to the addition circuits 12 and 26' respectively of Fig. 2. The manner and extent of substitution of the circuit of Fig. 4 in the circuit of Fig. 2 will be apparent to those skilled in the art from what has been said hereinbefore. The operation of the circuit of Fig. 2 modified by the circuit of Fig. 4 for deriving equal and opposite polarity position voltages is clear because the voltage $E_0$ appears between relay terminals 97 and 100. This voltage (smoothed) is applied by the relay in opposite polarity to the connections 14 and 25'. Thus the voltage $E_0$ is available on connections 14 and 25' in opposite polarity.

It is apparent from the foregoing that there is disclosed a novel means and method for deriving an integrated voltage. The method and means of the invention provide accurate voltage integration which overcomes to a great degree the low-frequency limitation of a conventional integrating circuit. The invention also make it possible to avoid the use of a tachometer or tachometer generator required in certain previous integrating circuits employing tachometers to compare the rate-of-change of output with the input to secure integration.

What is claimed is:

1. In apparatus having a servo-mechanism and a load driven thereby, the method of deriving an output voltage which is the integral of an input voltage, comprising the steps of adding the output voltage to the input voltage, integrating the sum, subtracting the output voltage from the said integrated sum, employing the difference voltage as an error voltage to control the servo mechanism and the position of its load, and deriving as the output voltage a voltage proportional to the servo mechanism load position, whereby said output voltage is the integral of the input voltage.

2. A voltage integrator for integrating an input voltage comprising means to add the input voltage and the integrator output voltage, an integrating circuit of passive elements connected to receive the sum voltage output of said means, means to subtract said integrator output voltage from the integrating passive-element circuit output, a servo-mechanism having a load driven in response to an error voltage received by said servo-mechanism and connected to receive the difference voltage from said subtracting means as the error voltage, and means to derive a voltage proportional to the position of said load as said integrator output voltage, whereby said integrator output voltage is the integral of said input voltage.

3. The integrator claimed in claim 2, said voltage deriving means comprising a potentiometer having an arm driven as part of said load.

4. The integrator claimed in claim 2, said voltage deriving means comprising a pair of potentiometers, the arms of which are driven as part of said load.

5. The integrator claimed in claim 2, said voltage deriving means comprising a switch applying the same voltage in opposite polarities alternately to said adding means and to said subtracting means for addition and subtraction thereby.

6. The integrator claimed in claim 2, said voltage deriving means comprising a potentiometer having a resistor and an arm driven as part of said load and a tap on the potentiometer resistor, a pair of equal value serially connected resistors, one terminal of each resistor being connected at a junction with one of the other resistor, said arm and said tap being connected across said pair of resistors, said one resistor terminals being connected to a common ground connection at their said junction, whereby equal value opposite polarity voltages with respect to said ground connection are available at the other said resistor for supplying to said voltage adding and subtracting means respectively.

7. A voltage integrator for integrating an input voltage comprising a first addition circuit for adding two voltages received thereby and having a connection to receive said input voltage as one of said two voltages and connected to receive said voltage integrator output as the other, an integrating circuit of passive elements connected to receive the sum of said two voltages from said first addition circuit, a second addition circuit connected to receive and to add the sum voltage from said integrating circuit of passive elements and to receive a voltage equal to but of opposite sense from that of said voltage integrator output, a servo-mechanism connected to receive the output of said second addition circuit as an error voltage and having a load, a potentiometer means for deriving equal and opposite polarity voltages one of which is the voltage integrator output received by said first addition circuit and the other of which is said opposite polarity voltage received by said second addition circuit, said potentiometer having an arm driven as part of said load.

8. The voltage integrator claimed in claim 7, said integrating circuit of passive elements comprising a serially connected resistor and capacitor across which the sum voltages from said first addition circuit is applied.

9. The voltage integrator claimed in claim 7, said addition circuits each comprising a resistor network.

10. The voltage integrator claimed in claim 7, said integrating circuit of passive elements comprising a serially connected resistor and capacitor across which the sum voltage from said first addition circuit is applied, said addition circuits each comprising a resistor network.

JOHN H. SWEER.

References Cited in the file of this patent

UNITED STATES PATENTS

| Number | Name | Date |
| --- | --- | --- |
| 2,494,036 | Darlington | Jan. 10, 1950 |
| 2,513,537 | Williams | July 4, 1950 |

OTHER REFERENCES

Electrical Analogue Computing, D. J. Mynall, "Electronic Engineering," July 1947, pages 214–217.

Electronic Instruments, J. A. Greenwood, Jr., et al., McGraw-Hill Book Co., New York, 1948, Fig. 4.32 relied upon.

An Analog Computer, J. G. Bayly, "Review of Scientific Instruments," vol. 21, No. 3, March 1950, pages 228–231.